United States Patent
Hamamoto

(10) Patent No.: US 9,133,938 B2
(45) Date of Patent: Sep. 15, 2015

(54) SEALING DEVICE

(71) Applicant: NOK CORPORATION, Tokyo (JP)

(72) Inventor: Kokichi Hamamoto, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 14/493,945

(22) Filed: Sep. 23, 2014

(65) Prior Publication Data

US 2015/0097344 A1 Apr. 9, 2015

(30) Foreign Application Priority Data

Oct. 4, 2013 (JP) ................................. 2013-209064

(51) Int. Cl.
*F16J 15/32* (2006.01)
(52) U.S. Cl.
CPC .................................. *F16J 15/3244* (2013.01)
(58) Field of Classification Search
CPC ........ F16J 15/32; F16J 15/324; F16J 15/3244
USPC .................................................. 277/549, 559
See application file for complete search history.

(56) References Cited

U.S. PATENT DOCUMENTS

| | | | | |
|---|---|---|---|---|
| 4,819,949 A | * | 4/1989 | Otto | 277/351 |
| 6,729,624 B1 | * | 5/2004 | Johnston | 277/560 |
| 2010/0194055 A1 | * | 8/2010 | Syamoto | 277/549 |
| 2014/0312571 A1 | * | 10/2014 | Kurth | 277/559 |

FOREIGN PATENT DOCUMENTS

JP 2005-315398 A 11/2005

* cited by examiner

*Primary Examiner* — Gilbert Lee
(74) *Attorney, Agent, or Firm* — Harness, Dickey & Pierce, P.L.C.

(57) ABSTRACT

A sealing device with a lip edge portion 2a and a sealing-space-opposite-side conical surface 2b whose diameter increases from the lip edge portion 2a toward a sealing space B opposite side is formed on an inner peripheral surface of a seal lip 2, and a first thread ridge 21 that obliquely extends in a given direction with respect to a circumferential direction, a second thread ridge 22 that obliquely extends in a direction opposite to the direction in which the first thread ridge 21 obliquely extends, and a circumferential ridge 23 that extends in the circumferential direction while intersecting the first thread ridge 21 and the second thread ridge 22 are formed on the sealing-space-opposite-side conical surface 2b.

1 Claim, 4 Drawing Sheets

SEALING DEVICE

CROSS-REFERENCE TO RELATED APPLICATIONS

This application claims the benefit and priority of Japanese Application No. 2013-209064, Filed Oct. 4, 2013. The entire disclosure of the above application is incorporated herein by reference.

FIELD

The present disclosure relates to sealing devices that use a seal lip to seal an outer circumference of a rotating body for automobiles, general machinery, or industrial machinery, and more particularly to the same formed with a ridge on the seal lip to attain a seal using a screw-seal action.

BACKGROUND

Conventionally, a sealing device, like the one depicted in FIG. 3, that is formed with a ridge to attain a screw-seal action at a seal lip is known.

This sealing device is equipped with a seal lip 100 formed by a rubber-like elastic material (a synthetic resin material that includes rubber material and rubber-like elasticity); at an inner peripheral surface of this seal lip 100, a sealing-space-side-conical surface 102 whose large diameter increases to a degree of a sealing space (in-machine) A side, and a sealing-space-opposite-side conical surface 103 whose large diameter increases to a degree of a sealing space (out-of-machine) B side are formed, using a smallest-diameter lip-edge portion 101 as a boundary; and a plurality of first thread ridges 104 and second thread ridges 105 are formed at the sealing-space-opposite-side conical surface 103. Widths and heights of the first thread ridges 104 and the second thread ridges 105 are constant across an entire length, the ridges being disposed alternately to face opposite directions in a circumferential direction using a plurality of ridges as one set.

In other words, the sealing device constituted as described above attains shaft-sealing functionality with the lip-edge portion 101 of an inner diameter of the seal lip 100, fitted into the inner circumference surface of a housing, not shown in the drawing, closely fitted to be able to slide on an outer circumference surface of a rotating shaft 200 to inhibit oil in a sealing space A from leaking from around the shaft into an opposite sealing space B. Also, both of the first thread ridges 104 and the second thread ridges 105 attain screw-pump action in a forward direction to the rotation of the rotating shaft 200, in a rotation in either a forward or a reverse direction rotation of the rotating shaft 200. For that reason, oil that is trying to leak from the seal lip 100 at the sliding portion of the rotating shaft 200 of the sealing space A to the sealing space B opposite side is returned to the sliding portion side by forward direction screw-pump action, attaining a good sealing functionality.

Also, the sealing device depicted in FIG. 4 to suppress a drop in the screw-pump action caused by friction of the first thread ridges 104 and the second thread ridges 105, the first thread ridges 104 and the second thread ridges 105 are formed into boat-bottom-shaped projections whose widths and heights become largest at an intermediate portion in a length direction. (For example, see the Patent Document reference listed below.)

PRIOR ART DOCUMENTS

Patent Documents

[Patent Document 1] Japanese unexamined patent application publication 2005-315398

SUMMARY

However, pursuant to the conventional sealing device, although a thread ridge on one of the first thread ridges 104 and the second thread ridges 105 attain a screw-pump action in a forward direction to push back to a sealing space A side oil that is trying to leak, an oblique thread ridge on another side facing an opposite direction to this has a slight scraping action, by an opposite-direction screw-pump action, on an oil film interposed between the lip-edge portion 101 and the rotating shaft 200. For that reason, as shown in FIG. 4, if the first thread ridges 104 and the second thread ridge 105 are formed into protruding boat-bottom shapes, the scraping action will be increased giving rise to a concern that that can cause a leak.

In view of the point described above, a technical problem for the present disclosure is effectively to prevent a leak caused by the scraping action of thread ridges at a rotation of a rotating body (rotating shaft), in a sealing device disposed with the thread ridges on the seal lip alternately to be opposed in a circumferential direction.

As means for effectively solving the technical problem described above, the sealing device pursuant to the present disclosure is formed with a lip-edge portion closely fitted into an inner circumference surface of a seal lip, to be able to slide on an outer circumference surface of a rotating body; a first thread ridge formed with a sealing-space-opposite-side conical surface that becomes a large diameter from the lip-edge portion toward a sealing space opposite side, that extends obliquely in a constant direction to a circumference direction; a second thread ridge that extend obliquely in a direction opposite to the first thread ridge; and a circumferential direction ridge that extends in the circumferential direction by intersecting the first thread ridge and the second thread ridge.

In the configuration above, one of the first thread ridge and the second thread ridge attains a forward screw-pump action to push back a fluid trying to leak from a sealing space at a sliding portion of a seal lip and a rotating body to a sealing space side by rotation of the rotating body. Also, the other of the first thread ridge and the second thread ridge attains a slight scraping action by a reverse direction screw-pump action on oil that interposes the sliding portion of the lip seal and the rotating body, but the fluid scraped by this is dammed by the circumferential ridge and flows in the circumferential direction along the circumferential direction ridge, and is returned to the sealing space by the forward direction screw-pump action of the one of the first thread ridge and the second thread ridge.

Pursuant to the sealing device according to the present disclosure, a flow in a leak direction caused by an opposite-direction screw-pump action is dammed by a circumference-direction ridge, and pushed back to a sealed space side by a forward-direction screw-pump action, effectively being prevented from leaking.

DRAWINGS

DETAILED DESCRIPTION

A preferred embodiment of the present disclosure will now be described below with reference to FIGS. 1 and 2.

Figure 1:
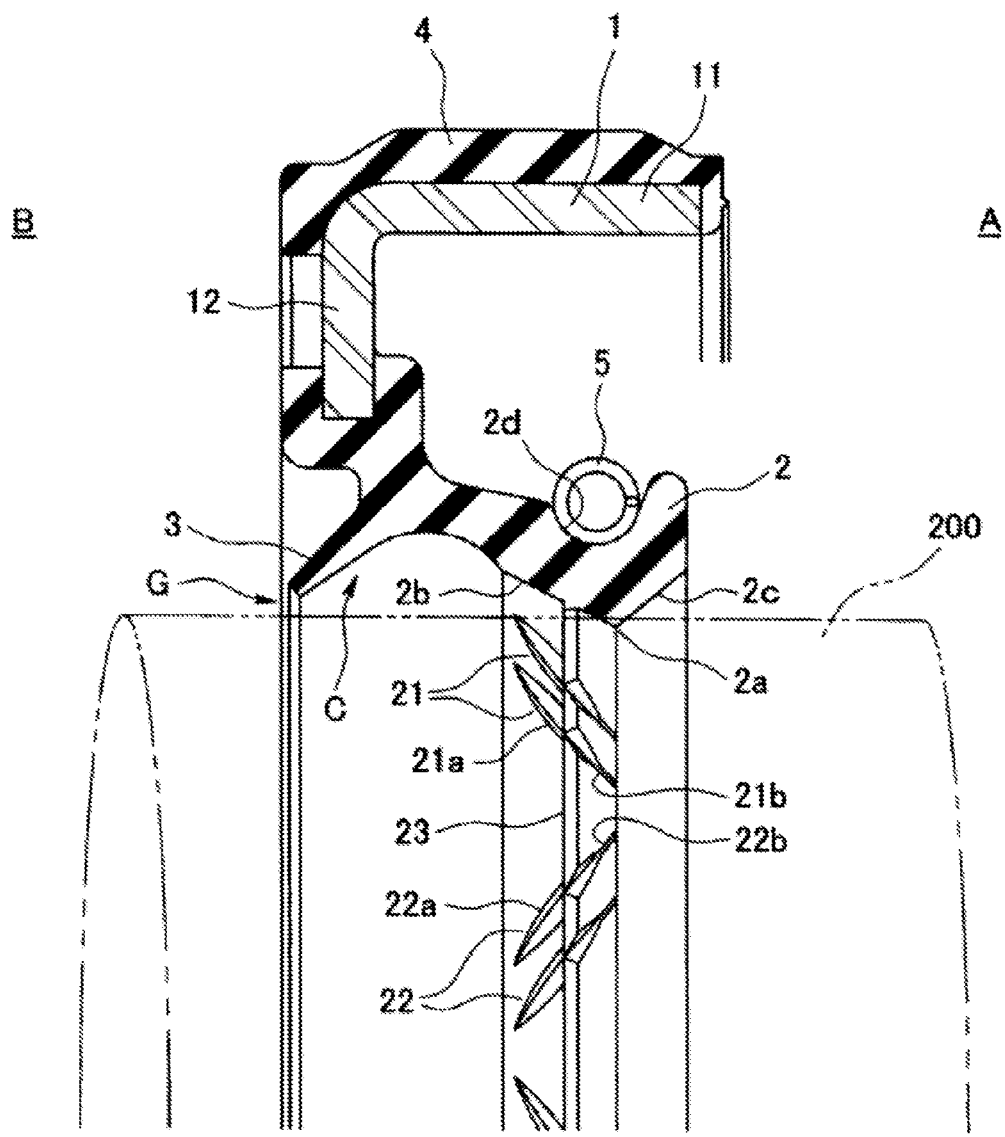
FIG. 1 is a sectional view of one side showing a preferred embodiment of a sealing device pursuant to the present disclosure, cut at a flat plane through an axial core.

In the sealing device depicted in FIG. 1, a seal lip 2, a dust lip 3, and a fastening seal 4 are integrated and disposed on a metallic reinforcement ring 1. The seal lip 2, the dust lip 3 and the fastening seal 4 at an outer circumference thereof are composed of a rubber-like elastic material (a synthetic resin material that includes rubber material and a rubber-like elasticity), and are mutually continuous. Also, a garter spring 5 is mounted to the outer circumference surface near a leading end of the seal lip 2.

The reinforcement ring 1 is manufactured by punch-press forming a metal sheet or the like. This is composed of an outer-diameter cylinder portion 11, and an inner-facing collar portion 12 that extends from an edge of the outer-diameter cylinder 11 that is an opposite sealing space (out-of-machine) B side in a mounted state.

Seal lip 2 extends from a position at an inner peripheral side of the inner-facing collar portion 12 on the reinforcement ring 1 in a direction of the sealing-space A side when in the mounted state, and at an inner peripheral surface near the leading end thereof, a lip-edge portion 2a with the smallest diameter is closely fitted to be able to slide with the outer peripheral surface of the rotating shaft 200; a sealing-space-opposite-side conical surface 2b whose diameter increases from the lip-edge portion 2a toward the sealing space B; and a sealing-space conical surface 2c whose diameter increases from the lip-edge portion 2a toward the sealing space A are formed. For that reason, a sectional shape of the lip-edge portion 2a that is positioned between the sealing-space-opposite-side conical surface 2b and the sealing-space conical surface 2c that mutually are opposite, substantially forms a V shape. Also, the rotating shaft 200 is equivalent to the rotating body disclosed in the scope of patent claims.

The first thread ridges 21 that extend at a predetermined oblique angle to the circumferential direction (a direction that the lip-edge portion 2a extends), the second thread ridges 22 that extend obliquely in an opposite direction to the first thread ridges 21, and the circumferential ridge 23 that extends in the circumferential direction intersecting the first thread ridges 21 and the second thread ridges 22, are formed on the sealing-space-opposite-side conical surface 2b on the seal lip 2.

More specifically, the first thread ridges 21 and the second thread ridges 22 are composed of boat-bottom-shaped ridges 21a and 22a formed into a protruding shape so that their widths and heights change to become largest at an intermediate portion in a length direction; and small ridges 21b and 22b that reach the lip-ridge portion 2a by extending from an end of the lip-edge portion 2a, and whose widths and heights are constant, are smaller than the intermediate portion of the boat-bottom-shaped ridges 21a and 22a in the length direction, and are shorter than the boat-bottom-shaped ridges 21a and 22a. These first thread ridges 21 and second thread ridges 22 are disposed with a plurality of ridges (2 ridges in the example in the drawing) as one set, alternately in the circumferential direction.

The circumferential ridge 23 has a sectional chevron shape whose width and height are constant, and extends intersecting the boat-bottom-shaped ridges 21a and 22a in the first thread ridges 21 and the second thread ridges 22. Also, a peak of the circumferential ridge 23 is preferred to have a height that is equal to or higher than a peak of the boat-bottom-shaped ridges 21a at a position intersecting the circumferential ridge 23.

The dust lip 3 extends in a conical cylinder shape from a position at an inner circumference of the inner-facing collar portion 12 on the reinforcement ring 1 toward an opposite side (a direction that is the sealing space B opposite side when in a mounted state) to the seal lip 2, and its inner diameter at a leading end is a slightly larger diameter than the outer circumference surface of the rotating shaft 200; a small gap G is formed between that and the outer circumference surface of the rotating shaft 200. For that reason, an annular space C defined by the seal lip 2 and the dust lip 3 at the outer circumference of the rotating shaft 200 does not become a negative pressure caused by the forward direction screw-pump action of the first thread ridges 21 and the second thread ridges 22.

A fastening seal 4 is formed by a rubber-like elastic member that is contiguous with the seal lip 2 and the dust lip 3 going around the outer circumference of the outer-diameter cylinder portion 11 of the reinforcement ring 1. This is fitted and fastened in a suitable compressed state toward a radial direction at the inner circumference of housing, not shown in the drawing.

The garter spring 5 is a metallic coil spring connected in a ring shape. It is fitted onto a ring groove 2d formed positioned at the outer circumference of the lip edge 2a at an outer circumference surface near a leading end at the seal lip 2.

The sealing device equipped with the configuration described above prevents oil in the sealing space A from leaking from the shaft circumference to the sealing space B opposite side, by the fastening seal portion 4 being press-fitted into and mounted to the inner circumference surface of a housing, not shown in the drawing, so that the seal lip 2 faces the sealing space A, and by the lip edge 2a on the seal lip 2 being closely fitted to be able to slide on the outer circumference surface of the rotating shaft 200.

Figure 2:
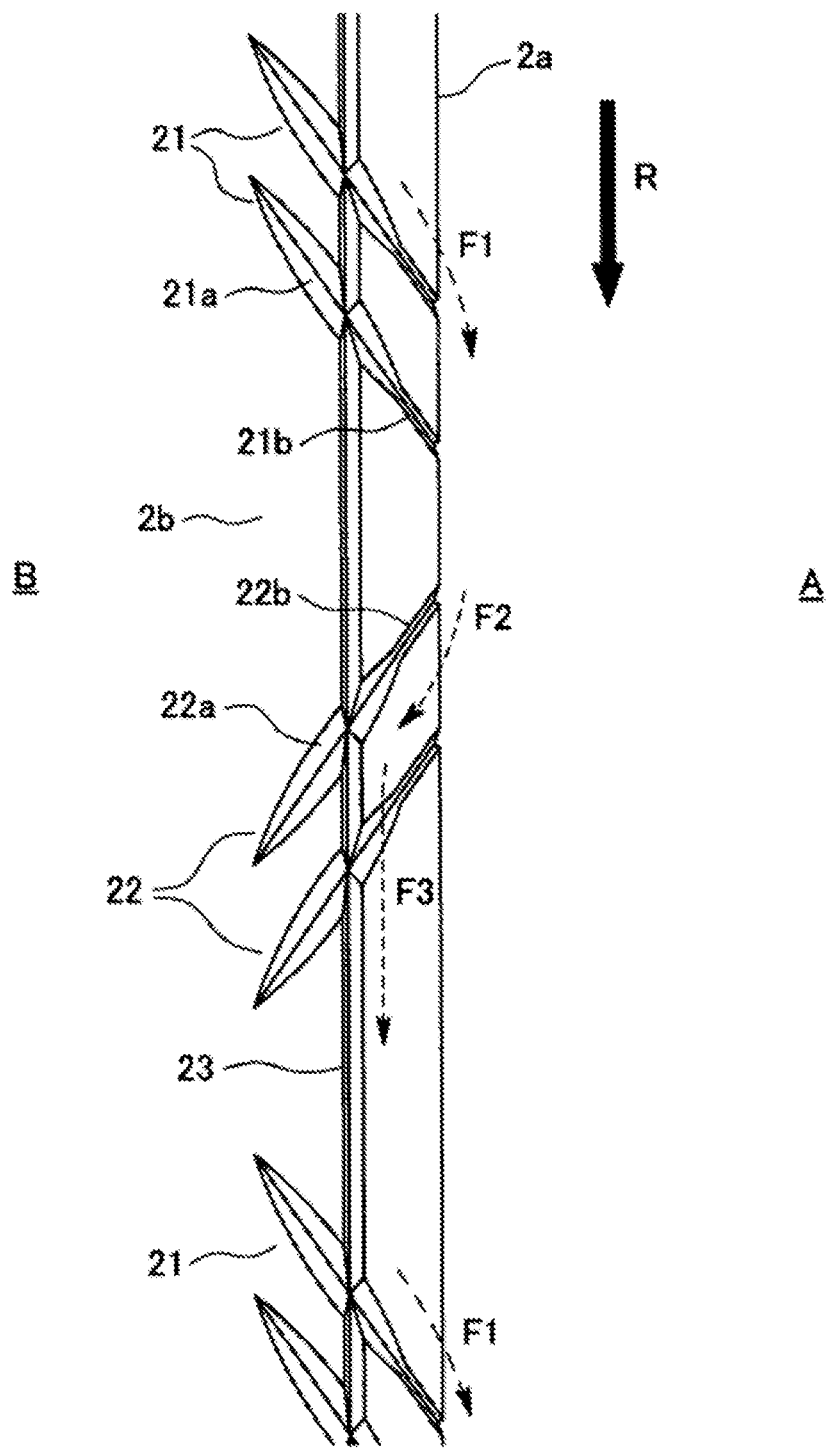
FIG. 2 is an explanatory view showing an action of the sealing device pursuant to the present disclosure.
Figure 3:
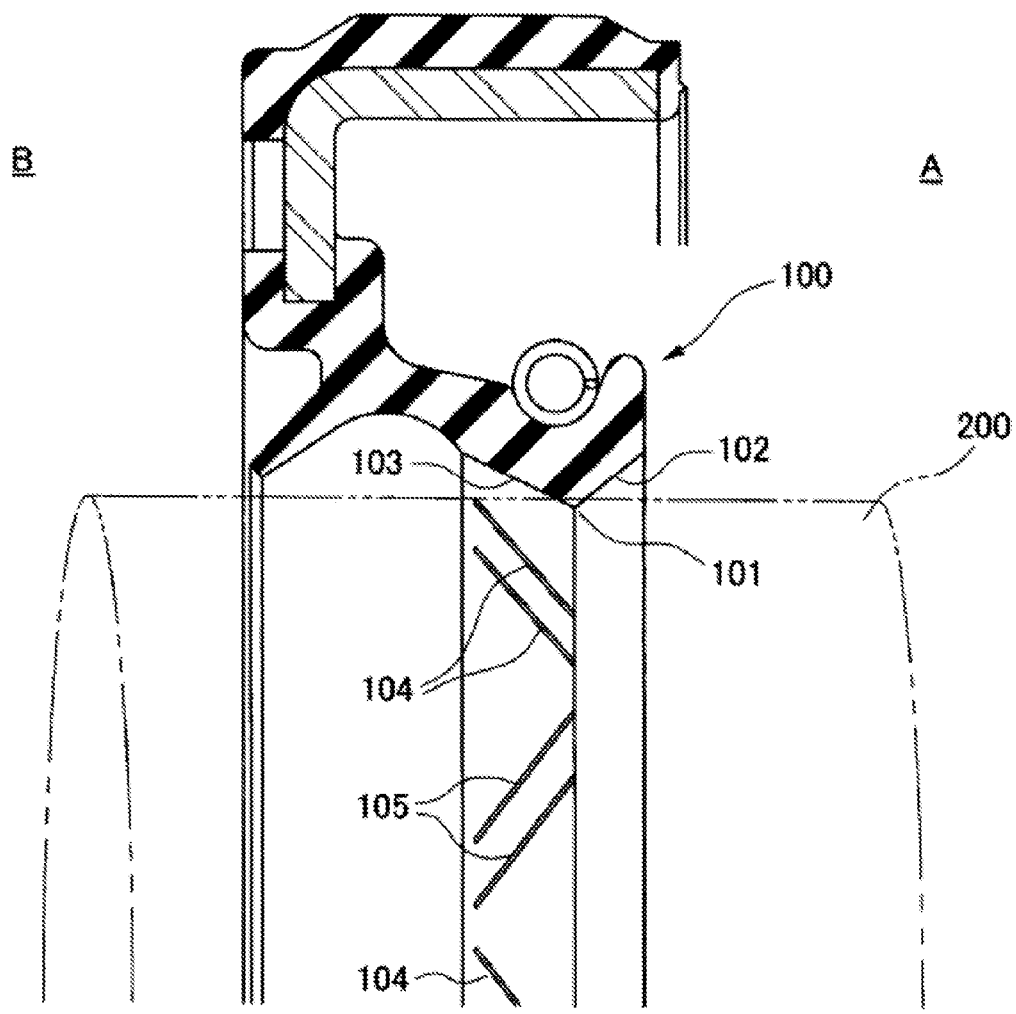
FIG. 3 is a sectional view of one side showing one example of a sealing device of the prior art, cut at a flat plane through an axial core.
Figure 4:
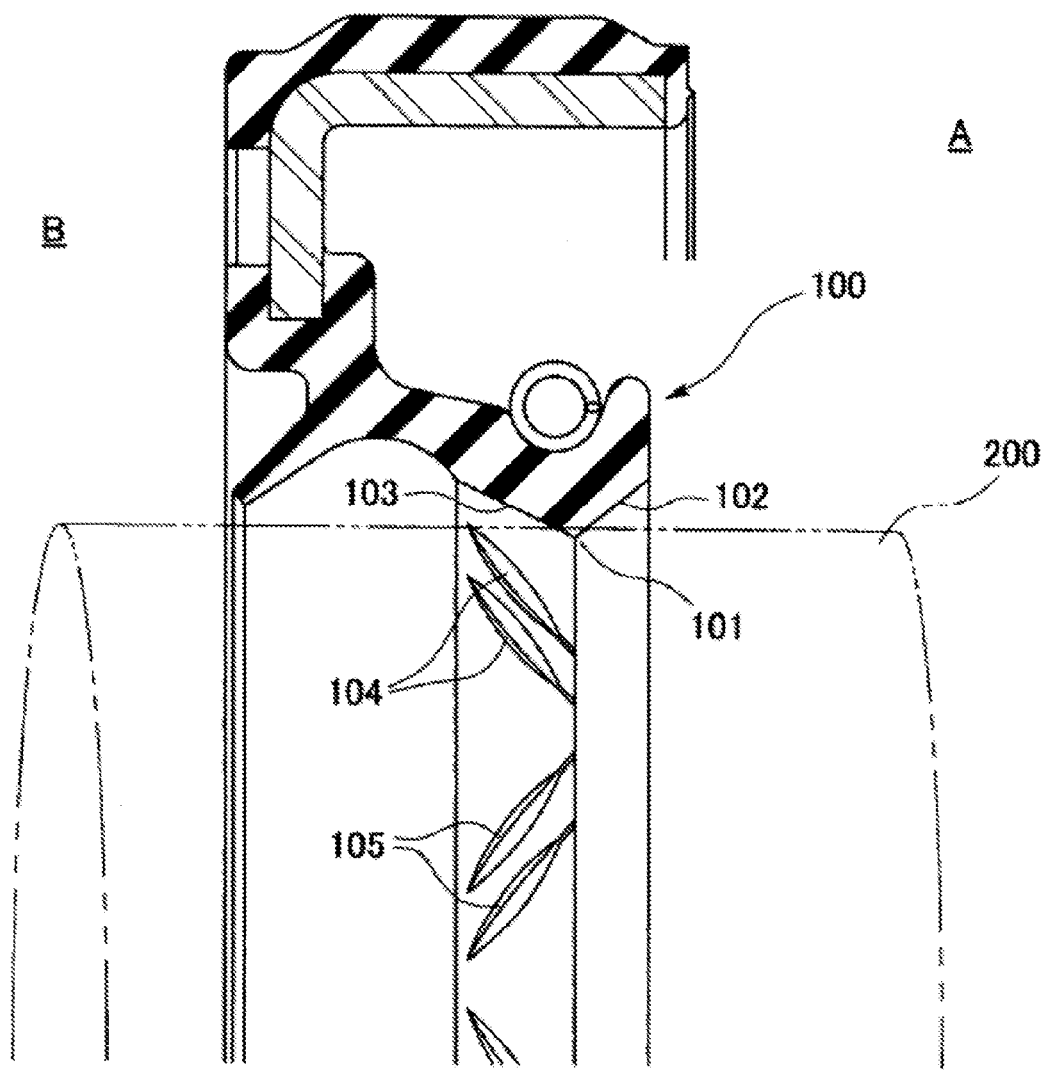
FIG. 4 is a sectional view of one side showing another example of a sealing device of the prior art, cut at a flat plane through an axial core.

Here, assuming a case in which the outer circumference surface moves in a direction of R in FIG. 2, for example, by a rotation of the rotating shaft 200, a fluid that exists at the outer circumference of the rotating shaft 200 also moves (moving together) in the R direction by touching the outer circumference surface of the rotating shaft 200. For that reason, at the sealing space B opposite side from the seal lip 2 and the lip edge 2a, of the first thread ridges 21 and the second thread ridges 22 formed at the sealing-space-opposite-side conical surface 2b, the first thread ridges 21 initiates the forward direction pumping action in the R direction. In other words, it initiates the screw-pump action to feed the fluid moving together in the R direction to the sealing space A, as indicated by the arrow F1. For that reason, even if a portion of the sealed target oil that exists in the sealing space A tries to leak through the sliding portion of the lip edge 2a into the sealing space B opposite side, this oil is pushed back to the sealing space A by the forward direction screw-pump action of the first thread ridge 21.

Conversely, the second thread ridge 22 initiates a reverse-direction screw-pump action in the R direction with the rotation of the rotating shaft 200, in other words it initiates a screw-pump action to scrape out fluid moving together in the R direction, to the sealing space B opposite side as indicated by the arrow F2. However, even if the oil is scraped from the sliding portion of the lip edge 2a to the sealing space B opposite side by the screw-pump action in a reverse direction to the R direction, the leaked oil is dammed by the circumferential ridge 23 that extends intersecting the boat-bottom-shaped ridges 21a and 22a at the first thread ridges 21 and the second thread ridges 22, and as indicated by the arrow F3, the leaked oil is induced in a circumferential direction along the circumferential ridge 23 and is returned to the sealing space A by the screw-pump action of the first thread ridges 21.

Also, in a case in which the outer circumference surface moves in a direction that is opposite to the R direction in FIG. 2, for example, by rotation of the rotating shaft 200, conversely to the description above, the second thread ridges 22 initiate the forward-direction screw-pump action, in other words, it initiates the screw-pump action to feed the fluid that is moving together, to the sealing space A, in other words, the reverse direction screw-pump action of the first thread ridges 21 induce the screw-pump action to scrape the fluid that is moving together to the sealing space B opposite side.

In such a case, even if the oil from the sliding portion of the lip edge 2a is scraped to the sealing space B opposite side by the screw-pump action of the first thread ridges 21 in the direction opposite to the R direction, the leaked oil is dammed by the circumferential ridge 23 and is induced to the circumferential direction along the circumferential ridge 23 and returned to the sealing space A by the forward direction screw-pump action of the second thread ridges 22.

Therefore, regardless of the rotating direction of the rotating shaft 200, leaks of sealed target oil to the sealing space B opposite side are effectively prevented.

Also, the first thread ridges 21 and the second thread ridges 22 in the embodiment depicted in the drawings include boat-bottom-shaped ridges 21a and 22a. However, this can be applied if the widths and heights of the first thread ridges 21 and the second thread ridges 22 are constant over the entire length.

EXPLANATION OF LETTERS OR NUMERALS

2 Seal lip
2a Lip edge
2b Sealing-space-opposite-side conical surface
21 First thread ridge
22 Second thread ridge
23 Circumferential ridge
200 Rotating shaft
A Sealing space
B Opposite sealing space

The invention claimed is:
1. A sealing device,
wherein a lip edge portion and a sealing-space-opposite-side conical surface whose diameter increases from the lip edge portion toward a sealing space opposite side is formed on an inner peripheral surface of a seal lip, and
wherein a first thread ridge that obliquely extends in a given direction with respect to a circumferential direction, a second thread ridge that obliquely extends in a direction opposite to the direction in which the first thread ridge obliquely extends, and a raised circumferential ridge that extends in the circumferential direction while intersecting the first thread ridge and the second thread ridge is formed on the sealing-space-opposite-side conical surface.

* * * * *